United States Patent Office 3,028,434
Patented Apr. 3, 1962

3,028,434
CATALYTIC PRODUCTION OF ETHYLENE GLYCOL
Paul B. Weisz, Media, Pa., assignor to Socony Mobil Oil Company, Inc., a corporation of New York
No Drawing. Filed Aug. 5, 1959, Ser. No. 831,689
7 Claims. (Cl. 260—635)

This invention relates to a process for the production of ethylene glycol by reaction of ethylene oxide and water in the presence of a unique inorganic solid catalyst.

The most widely used commercial method for producing ethylene glycol at the present time involves the reaction of ethylene oxide and water in the presence of sulfuric acid as a catalyst. The use of solid catalysts, affording easy separation of catalyst reactants, has been a natural area for suggested improvement in operating economics. Thus, it has heretofore been proposed to utilize various solid catalysts for promoting and controlling the reaction of ethylene oxide and water to form ethylene glycol. In this regard, attempts have been made to use solid acid-type catalysts such as, for example, phosphoric acid deposited on alumina, silica gel, thoria, and other supports. Such composites have not proved feasible for their intended purpose and substantially no formation of ethylene glycol was thereby realized. On the contrary, considerable amounts of undesired aldehydes were formed. Silver oxide deposited on an alumina carrier has also been suggested as a catalyst for the reaction of ethylene oxide and water to produce ethylene glycol. While this catalyst was more effective than the aforementioned acidic type catalysts, the silver oxide catalyst likewise gave rise to undesired aldehyde by-products which interfered with the desired course of catalytic activity by depositing on the surface of the catalyst. It has further been known to effect the catalytic hydration of ethylene oxide in the presence of certain organic ion exchange resins as catalysts. The latter, however, have had the disadvantage of being thermally unstable at elevated temperatures such as accompany exothermic type reactions, among which is the catalytic hydration of ethylene oxide.

It is an object of this invention to provide an effective catalytic process for the manufacture of ethylene glycol by catalytic hydration of ethylene oxide in the presence of a solid catalyst characterized by high selectivity and high thermal stability. Another object of this invention is the provision of a process for effecting catalytic hydration of ethylene oxide to ethylene glycol without encountering the disadvantages inherent in the processes heretofore employed. A further object is the provision of an efficient commercially attractive process for the catalytic hydration of ethylene oxide to ethylene glycol in the presence of an active inorganic solid catalyst.

The above and other objects which will be apparent to those skilled in the art are achieved in accordance with the process of this invention. Broadly, the process described herein comprise the production of ethylene glycol by reacting ethylene oxide with water, under conversion conditions, in the presence of a solid porous crystalline aluminosilicate zeolite characterized by a rigid three-dimensional network and a homogeneous pore structure made up of uniform interstitial dimensions of at least 4 Angstrom units in cross section. The aluminosilicate having rigid three dimensional networks made up of unit cells is further characterized by the substantial absence of change in unit cell dimension upon dehydration and rehydration. Such aluminosilicates have, in accordance with the present invention, unexpectedly, been found to possess high catalytic activity in effecting hydration of ethylene oxide to ethylene glycol. The specified crystalline aluminosilicates have further been found to be selective in producing ethylene glycol with minimum formation of undesired aldehyde by-products. In addition, the metal aluminosilicates serving as catalysts in the process of this invention possess the desirable attribute of being thermally stable under conditions of elevated temperature.

The metal aluminosilicates employed in present process are essentially dehydrated forms of crystalline siliceous zeolites, containing varying quantities of sodium, calcium and aluminum with or without other metals. All or a portion of the sodium and calcium ions normally contained in the zeolitic structure may be replaced with a number of other ions. The atoms of sodium, calcium or metals is replacement thereof, silicon, aluminum and oxygen are arranged in a definite and consistent crystalline pattern. Such structure contains a large number of small cavities, interconnected by a number of still smaller channels. These cavities and channels are precisely uniform in size. Chemically, these zeolites may be represented by the general formula:

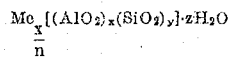

where Me is a metal cation,

is the number of exchangeable metal cations of valence $n$, $x$ is also the number of aluminum ions combined in the form of aluminate, $y$ is the number of silicon atoms and $z$ is the number of water molecules, removal of which produces the characteristic channel system. In the above formula, the ratio

is a number from 1 to 5 and usually from 1 to 2. Zeolites having the above characteristics have sometimes been referred to as molecular sieves. At the present time, there are commercially available molecular sieves of the "A" series and of the "X" series. A synthetic zeolite known as "Molecular Sieve 4A" is a crystalline sodium aluminosilicate having channels about 4 Angstroms in diameter. In the hydrated form, this material is chemically characterized by the formula:

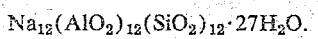

The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the rate of one calcium ion for two sodium ions. A crystalline sodium aluminosilicate which has pores or channels of approximately 13 Angstrom units in diameter is also available commercially under the name of "Molecular Sieve 13X." The letter "X" is used to distinguish the interatomic structure of this zeolite from that of the "A" crystals mentioned above. As prepared, the 13X material contains water and has the unit cell formula

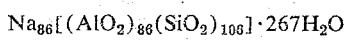

The parent zeolite is dehydrated to make the active catalyst. The 13X crystal is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels above 10 Angstrom units in diameter and in which a substantial proportion of the sodium ions of the 13X material have been replaced by calcium.

Molecular sieves of the "A" series consist fundamentally of a three-dimensional tetrahedral structure of silicon and aluminum. These tetrahedra are joined by sharing oxygen atoms in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$ is equal to unity. One cation may be exchanged either in entirety or partially by another cation utilizing ion exchange techniques as discussed hereinbelow. The spaces between the tetrahedra are occupied by molecules of water prior to dehydration.

Molecular sieves of the "A" series are ordinarily prepared initially in the sodium form of the crystal. The sodium ions in such form may, as desired, be exchanged for other alkali metal or alkaline earth metal cations. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water-washed until the water in equilibrium with the zeolite has a pH in the range of 9 to 12. After activating by heating until dehydration is attained, the substance is ready for use.

The empirical formula for the zeolites utilized herein can be expressed as:

$$\frac{M_2}{n}O \cdot Al_2O_3 \cdot XSiO_2 \cdot YH_2O$$

where M is a metal and $n$ is the valence of the metal. A specific crystalline zeolite has values of X and Y within a definite range. The value of X for any specific zeolite varies in a certain manner depending on whether aluminum or silicon atoms occupy equivalent positions in the lattice. For molecular sieves of the "A" series, X has an average value of $1.85 \pm 0.5$. The value of Y, depending on the condition of hydration and on the metal cation present may vary from 6 to 0. The average value of Y for the completely hydrated sodium zeolite of the "A" series is 5.1. In the above general formula, the ratio of $Na_2O$ to $Al_2O_3$ is equal to 1. However, if during the process of preparation, excess of the base present in the mother liquor is not eliminated by washing of the crystalline precipitate, analysis will show a ratio of slightly greater than 1. On the other hand, if the washing is excessive a certain amount of exchange of the sodium ions may occur bringing the aforementioned ratio to slightly less than 1. The ratio of

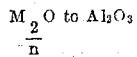

in the above general formula may accordingly be defined more accurately as being $1 \pm 0.2$.

Suitable reagents in the preparation of the sodium zeolite of the "A" series include silica gel, silicic acid or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the ranges $SiO_2/Al_2O_3$ of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. It is to be noted that the material first formed on mixing the above solutions is an amorphous precipitate generally catalytically inactive in the process of the invention. It is only after transformation of the amorphous precipitate to a crystalline form that the highly active catalyst described herein is obtained. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. For temperatures between room temperature (21° C.) and 150° C. an increase in temperature increases the velocity of the reaction and decreases its duration. As soon as the zeolite crystals are completely formed, they retain their structure and it is not essential to maintain the temperature of the reaction any longer in order to obtain a maximum yield of crystals. The initially obtained inactive precipitate may be distinguished from the highly active crystalline material by the fact that the former gives no X-ray diffraction pattern characteristic of large repeating distances while the latter gives a very well defined and characteristic X-ray diffraction pattern.

After the formation, the crystalline zeolite is separated from the mother liquor, usually by filtration. The crystalline mass is then washed, preferably with distilled water, and while on the filter, until the wash water, in equilibrium with the zeolite, reaches a pH of 9 to 12. The crystals are then dried at a temperature between 25° C. and 150° C. Activation is attained upon dehydration. The resulting crystalline zeolite has rigid three-dimensional networks made up of unit cells characterized by the substantial absence of change in unit cell dimensions upon dehydration and rehydration.

The sodium ions of the above zeolite may thus be replaced partially or completely by other metal cations. Suitable replacing ions include particularly those of other alkali metals such as lithium and potassium, alkaline earth metals such as calcium, strontium, and magnesium as well as various other ions such as those of copper, cobalt, zinc, silver, nickel and ammonium which are capable of replacing sodium ions without occasioning any appreciable change in the fundamental structure of the crystalline zeolite. Replacement is suitably accomplished by contacting the crystalline sodium aluminosilicate zeolite with a solution of an ionizable compound of the metal ion which is to be zeolitically introduced into the molecular sieve structure for a sufficient time to bring about the extent of desired introduction of such ion. After such treatment, the resulting exchanged product is water-washed and dried and thereafter is ready for use. The extent to which exchange takes place can be controlled. Thus, taking the exchange of sodium for calcium as a typical example, such exchange can be effected in a proportion of less than 5 percent up to 100 percent. One method of regulation of the degree of exchange consists of impregnating a known amount of the sodium zeolite with solutions containing determined amounts of exchangeable ions. In contacting the sodium zeolite of the "A" series and calcium ions, whenever the total available calcium in the solution is 5 percent of the quantity which could enter in the zeolite if all the sodium ions were to be replaced, effectively 5 percent of the sodium ions are replaced after about 20 minutes contact at room temperature. By using a three-fold excess of the amount of calcium theoretically necessary to obtain a complete exchange, a replacement of about 77 percent of the sodium ions is obtained in 20 minutes at room temperature. A more complete exchange can be effected if the temperature of contact is raised to 100° C. or if the exchange operation is repeated several times by replacing the used solution with a freshly formed solution. In such manner, a sodium zeolite of the "A" series may have all of its sodium replaced by calcium.

Sodium zeolite of the "A" series exchanged with calcium possesses larger pores than the unexchanged material. An unusual characteristic of the calcium exchanged zeolite is that the opening of the pores is not accomplished progressively as the sodium ions are replaced by calcium ions but is produced within a fairly narrow range of composition. When the exchange is 25 percent or less, the substance possesses substantially the same pore characteristics as the sodium zeolite of the "A" series, namely a pore diameter of about 4 Angstrom units. However, when the exchange exceeds 40 percent, the pore characteristics become those of the calcium zeolite of the "A" series, i.e. a pore diameter of about 5 Angstrom units. This remarkable effect is evident, for example, by the amount of normal heptane adsorbed on the sodium zeolite of the "A" series with increasing replacement of the sodium ions therein with calcium as shown below:

| Percent of Sodium Ions Replaced in Molecular Sieve 4A By Calcium Ions | Weight percent of Normal Heptane Adsorbed at 25°C. Under 45 mm. of Mercury |
|---|---|
| 0 | 0.1 |
| 10 | 0.1 |
| 25 | 1.3 |
| 40 | 13.8 |
| 70 | 15.5 |
| 100 | 16.5 |

As noted hereinabove, there are numerous forms of zeolites of the "A" series having exchanged ions. While generally, the substances containing a divalent alkaline earth metal have pore size characteristics analogous to those of calcium, the exact port size will differ. Such property can be advantageously employed in the process of the present invention in affording control of port size by suitable selection of a particular cation. Similarly, the substances having a monovalent alkali metal ion have pore size characteristics similar to the sodium zeolite of such series, but the precise port size is subject to similar control and selection.

Molecular sieves of the "X" series are characterized by the formula:

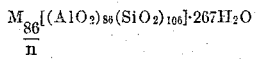

where M is Na+ or Ca++ or other alkali metal or alkaline earth metal ions introduced by replacement thereof and $n$ is the valence of the cation M. The structure consists of a complex assembly of 192 tetrahedra in a large cubic unit cell 24.95 A. on an edge. The effective port diameter is 10 to 13 A. and the adsorption volume is about 0.35 cc./gram of dehydrated zeolite.

For molecular sieves of this series, in the empirical formula:

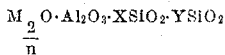

X has an average value of 2.5±0.5. The value of Y, depending on the condition of hydration and on the metal cation present may vary from 8 to 0. The average value of Y for the completely hydrated sodium zeolite of the "X" series is 6.2.

Molecular sieves of the "X" series are prepared in a manner similar to that described hereinabove for preparation of molecular sieves of the "A" series. However, for synthesis of the "X" series molecular sieves, the reaction mixture has a composition, expressed as mixtures of oxides, within the following limits: $SiO_2/Al_2O_3$ of 3 to 5, $Na_2O/SiO_2$ of 1.2 to 1.5 and $H_2O/Na_2O$ of 35 to 60.

In accordance with the present invention, it has been discovered that aluminosilicates of the type described above having pores or channels of about 4 Angstrom units in diameter or larger, generally in the range of 4 to 13 Angstrom units, effectively catalyze the hydration of ethylene oxide to ethylene glycol.

The aluminosilicate catalyst employed in the present process is preferably used in the form of small fragments of a size best suited for operation under the specific conditions existing. Thus, the catalyst may be in the form of a finely divided powder or may be in the form of pellets of 1/16" to 1/8" size, such as for example, obtained upon pelleting the crystalline aluminosilicate with a suitable binder such as clay. The commercially available material of the "A" and "X" series described hereinabove may be obtained on a clay-free basis or in the form of pellets in which clay is present as a binder.

The temperature of reacting ethylene oxide and water with the above described aluminosilicate catalyst may, due to the high activity of such catalyst, be carried out at temperatures as low as 0° C. The reaction temperature generally will not exceed about 500° C. The desired hydration proceeds rapidly at higher temperatures and extremely high reaction rates are obtained when passing ethylene oxide and steam through a bed of the above described catalyst at temperatures of 200° C. or more. Preferably, the temperature will be maintained within the approximate range of 30° C. to 150° C. The temperature of the process must be controlled due to the exothermic nature of the reaction taking place. Thus, since the hydration of ethylene oxide to ethylene glycol is a highly exothermic reaction, it is readily apparent that the heat produced by the reaction will rapidly increase the temperature of the catalyst. Heat exchange or cooling means is therefore ordinarily utilized for the reactor which contains the catalyst. Temperature control may be effected, if desired, by dilution of the gaseous feed stream with an inert gas or a coolant may be supplied to the reactor jacket.

The pressure under which the catalytic hydration of ethylene oxide is carried out in accordance with the process described herein may extend from sub-atmospheric pressure up to pressures of several atmospheres. In some instances, the use of lower-than-atmospheric pressure in the catalytic conversion zone is advantageous in affording a product of higher mono-to-polyglycol ratio than obtainable at atmospheric or higher pressures.

While generally, the alkali metal and alkaline earth metal aluminosilicate salts will be used as catalyst in the process described herein, it will be understood that other aluminosilicate salts formed by at least partial replacement of the alkali metal such as, for example, sodium ion with other metal or ammonium ion as described hereinabove are likewise contemplated as catalysts for use in the present process. In addition to the introduction of such various other ions by utilizing base exchange techniques, it is also contemplated that such metal ions may be deposited on or in the aluminosilicate along with its major cation such as, for example, alkali metal or alkaline earth metal. Thus, it is contemplated that an aluminosilicate salt of an alkali or alkaline earth metal may be impregnated with a small amount of silver or copper to afford an effective catalyst for use in the present process.

In some cases, it may be desirable to activate the alumino-silicate salt catalyst with gaseous carbon dioxide. In such instances, the gaseous carbon dioxide is feasibly conducted to the reaction zone along with the reactants. Alternatively, the catalyst may be activated by pretreating with gaseous carbon dioxide before being brought into contact with the reactants of ethylene oxide and water. The particular amount of carbon dioxide required to attain the desired promoting effect will vary depending on the specific catalyst employed. Generally, however, when employed, carbon dioxide will be present in the reaction zone in an amount of between about 0.005 and about 25 percent by weight based on the catalyst.

It is further within the purview of the present invention utilizing the described aluminosilicate catalyst to form ethylene oxide in situ by employing a feed containing ethylene, water and oxygen and to simultaneously convert the ethylene to ethylene oxide by oxidation and to effect hydration of the ethylene oxide so produced to ethylene glycol.

The following examples will serve to illustrate the process of the invention without limiting the same.

*Example 1*

Ethylene oxide in an amount of 100.6 grams and water in an amount of 42.8 grams, equivalent to a 1:1 mol ratio, were fed separately into a reaction zone containing a bed of 1/16" pellets of Molecular Sieve 13X. The temperature in the reaction zone was about 93° C. The time on stream was 243.5 minutes.

The resulting product was fractionated to remove ethylene glycol. The weight percent of ethylene oxide converted to glycol was 16.7. The liquid product was substantially free of aldehyde formation.

*Example 2*

One hundred ten and seven tenths (110.7) grams of a 1:10 mol ratio liquid blend of ethylene oxide and water was passed over a bed of 1/16" pellets of Molecular Sieve 4A at a temperature of about 93° C. for a period of about 30 minutes. The resulting product was fractionated to remove ethylene glycol and the weight percent conversion of ethylene oxide to ethylene glycol was found to be 35.6.

*Example 3*

Four hundred sixty-six (466) grams of a 1:10 mol ratio liquid blend of ethylene oxide and water was passed over a bed of 14–20 mesh (Tyler) particles of Molecular Sieve 4A at a temperature of about 96° C. for a period of 212 minutes. The resulting product was fractionated to remove ethylene glycol. The weight percent of ethylene oxide converted to glycol was 43.4. The liquid product was substantially free of aldehyde formation.

*Example 4*

Eight hundred and seventy one (871) grams of a 1:10 mol ratio liquid blend of ethylene oxide and water was passed over the catalyst of Example 3 at a temperature of about 96° C. for a period of 383 minutes. The weight percent of ethylene oxide converted to glycols was 16.9. The weight percent of mono glycol exceeded 78.2.

*Example 5*

Eight hundred and ninety-six (896) grams of a 1:10 mol ratio liquid blend of ethylene oxide and water were passed over 12–35 mesh (Tyler) particles of Molecular Sieve 4A at a temperature of about 96° C. for 314 minutes. The weight percent of ethylene oxide converted to glycols was 24.3. The weight percent of monoglycol was 69.4.

*Example 6*

Six hundred and thirty seven (637) grams of 1:10 mol ratio liquid blend of ethylene oxide to water was passed over the catalyst of Example 5 at a temperature of between 282 and 500° C. for a period of about 296 minutes. The weight percent of ethylene oxide converted to glycol was 14.2.

*Example 7*

Three hundred and ninety-two (392) grams of a 1:10 mol ratio liquid blend of ethylene oxide to water was passed over the catalyst of Example 6 at a temperature of about 288° C. for a period of about 182 minutes. The weight percent of ethylene oxide converted to glycol was 11.3. The weight percent of mono glycol exceeded 90.5. The liquid product was substantially free of aldehyde formation.

*Example 8*

Three hundred forty-five (345) grams of a 1:10 mol ratio liquid blend of ethylene oxide to water was passed over the catalyst of Example 7 at a temperature of 95° C. for a period of about 115 minutes utilizing a liquid hourly space velocity of 1.13. The weight percent of ethylene oxide converted to glycols was 29.3.

*Example 9*

Eighty-one (81) grams of a 1:10 mol ratio liquid blend of ethylene oxide to water was passed over the catalyst of Example 8 at a temperature of 71–79° C. for a period of about 50 minutes utilizing a liquid hourly space velocity of 0.85. The weight percent of ethylene oxide converted to glycols was 31.1.

*Example 10*

Two hundred and thirty-eight (238) grams of a 1:10 mol ratio liquid blend of ethylene oxide to water was passed over the catalyst of Example 9 at a temperature of 238° C. for a period of about 95 minutes utilizing a liquid hourly space velocity of 0.85. The weight percent of ethylene oxide converted to glycols was 25.2.

*Example 11*

Two hundred and thirteen (213) grams of a 1:10 mol ratio liquid blend of ethylene oxide to water was passed over 12–35 mesh (Tyler) particles of Molecular Sieve 5A at a temperature of about 96° C. for 106 minutes utilizing a liquid hourly space velocity of 0.85. The weight percent of ethylene oxide converted to glycols was 19.1.

*Example 12*

Two hundred and eighteen (218) grams of a 1:10 mol ratio liquid blend of ethylene oxide to water was passed over the catalyst of Example 11 at a temperature of about 238° C. for 106 minutes utilizing a liquid hourly space velocity of 0.85. The weight percent of ethylene oxide converted to glycols was 23.4.

*Example 13*

Two hundred and twenty-four (224) grams of a 1:10 mol ratio liquid blend of ethylene oxide to water was passed over 12–35 mesh (Tyler) particles of Molecular Sieve 10X at a temperature of about 96° C. for 93 minutes utilizing a liquid hourly space velocity of 0.85. The weight percent of ethylene oxide converted to glycols was 23.8.

*Example 14*

One hundred and fourteen (114) grams of a 1:10 mol ratio liquid blend of ethylene oxide to water was passed over 12–35 mesh (Tyler) particles of Molecular Seive 10X at a temperature of 17° C. for 245 minutes utilizing a liquid hourly space velocity of 0.85. The weight percent of ethylene oxide converted to glycols was 29.6.

*Example 15*

Sixty seven (67) grams of a 1:10 mol ratio liquid blend of ethylene oxide to water was passed over the catalyst of Example 14 at a temperature of 100° C. for 141 minutes utilizing a liquid hourly space velocity of 0.85. The weight percent of ethylene oxide converted to glycols was 28.6.

The high activity for the crystalline metal aluminosilicate salts described herein in catalyzing the hydration of ethylene oxide to ethylene glycol is evident from the results of the foregoing examples. The examples further demonstrate the ability to operate in either liquid phase or gas phase with the aluminosilicate catalyst. High selectivity against undesired aldehyde formation is particularly evident at low temperature liquid phase operation.

It is to be understood that the above description is merely illustrative of preferred embodiments of the invention, of which many variations may be made by those skilled in the art without departing from the spirit thereof,

I claim:

1. A process for producing ethylene glycol which comprises effecting reaction of ethylene oxide and water, at a temperature between about 0° C. and about 500° C., in the presence of a catalyst consisting essentially of a solid crystalline aluminosilicate zeolite having a rigid three-dimensional network and a homogeneous pore structure made up of uniform interstitial dimensions within the approximate range of 4 to 13 Angstrom units in cross section and recovering the ethylene glycol product.

2. A process for producing ethylene glycol which comprises effecting reaction of ethylene oxide and water, at a temperature between about 0° C. and about 500° C., in the presence of a catalyst selected from the group consisting of crystalline alkali metal and alkaline earth metal aluminosilicates having a rigid three-dimensional network and a homogeneous pore structure made up of uniform interstitial dimensions within the approximate range of 4 to 13 Angstrom units in cross section and recovering the ethylene glycol product.

3. A process for producing ethylene glycol which comprises effecting reaction of ethylene oxide and water, at a temperature between about 30° C. and about 150° C., in the presence of a catalyst selected from the group consisting of crystalline alkali metal and alkaline earth metal aluminosilicates having a rigid three-dimensional network and a homogeneous pore structure made up of uniform interstitial dimensions within the approximate range of 4 to 13 Angstrom units in cross section and recovering the ethylene glycol product.

4. A process for producing ethylene glycol which comprises effecting reaction of ethylene oxide and water, at a temperature between about 0° C. and about 500° C., in the presence of a catalyst consisting essentially of a solid crystalline sodium aluminosilicate having a rigid three-dimensional network and a homogeneous pore structure made up of uniform interstitial dimensions of approximately 4 Angstroms in cross section and recovering the ethylene glycol product.

5. A process for producing ethylene glycol which comprises effecting reaction of ethylene oxide and water, at a temperature between about 0° C. and about 500° C., in the presence of a catalyst consisting essentially of a solid crystalline sodium aluminosilicate having a rigid three-dimensional network and a homogeneous pore structure made up of uniform interstitial dimensions of approximately 13 Angstrom units in cross section and recovering the ethylene glycol product.

6. A process for producing ethylene glycol which comprises effecting reaction of ethylene oxide and water, at a temperature between about 0° C. and about 500° C., in the presence of a catalyst consisting essentially of a solid crystalline calcium aluminosilicate having a rigid three-dimensional network and a homogeneous pore structure made up of uniform interstitial dimensions of approximately 5 Angstrom units in cross section and recovering the ethylene glycol product.

7. A process for producing ethylene glycol which comprises effecting reaction of ethylene oxide and water, at a temperature between about 0° C. and about 500° C., in the presence of a catalyst consisting essentially of a solid crystalline calcium aluminosilicate having a rigid three-dimensional network and a homogeneous pore structure made up of uniform interstitial dimensions of approximately 10 Angstrom units in cross section and recovering the ethylene glycol product.

References Cited in the file of this patent

UNITED STATES PATENTS

| | | |
|---|---|---|
| 2,413,802 | Tollefson | Jan. 7, 1947 |
| 2,882,244 | Milton | Apr. 14, 1959 |

OTHER REFERENCES

Reed et al.: Ind. & Eng. Chem., vol. 48, pp. 205–8 (1956).